UNITED STATES PATENT OFFICE.

RAYMOND VIDAL, OF PARIS, ASSIGNOR TO LA SOCIÉTÉ ANONYME DES MATIÈRES COLORANTES ET PRODUITS CHIMIQUES DE ST. DENIS, OF ST. DENIS, FRANCE.

PROCESS OF TREATING CACHOU DE LAVAL.

SPECIFICATION forming part of Letters Patent No. 549,082, dated October 29, 1895.

Original application filed March 15, 1895, Serial No. 541,921. Divided and this application filed June 12, 1895. Serial No. 552,567. (Specimens.)

*To all whom it may concern:*

Be it known that I, RAYMOND VIDAL, of Paris, France, have invented certain new and useful Improvements in Processes for Obtaining Coloring-Matters by the Action of Alkaline Sulfites or Bisulfites on the Cachou de Laval, which improvements are fully described in the following specification.

In an application for patent, Serial No. 541,921, filed by me March 15, 1895, I have described the production of veritable soluble combinations capable of direct utilization in dyeing or printing by treating with alkaline sulfites or bisulfites a general class of coloring-matters obtained from the action of sulfur upon the bodies of the fatty or aromatic series.

The present application, which is a division and continuation of my said former application, is made to cover specifically the treatment of the brown coloring-matter known as "Cachou de Laval," leaving the broad invention to form the subject-matter of said prior application.

The invention is carried out as follows: The coloring-matter known as "Cachou de Laval" is dissolved in hot water and precipitated by means of dilute hydrochloric acid. The precipitate is thrown on a filter and washed with a little acidulated water. A paste is thus obtained which contains about fifteen per cent. of the dry product or coloring-matter. One hundred kilograms of the paste thus produced is thoroughly mixed with from fifty to sixty kilos of crystallized sulfite of soda and the homogeneous mixture is allowed to rest at ordinary temperatures for three days. After the expiration of that time it is filtered and is then ready to be used or sold as a commercial commodity. The product may also be dried and sold as a powder.

The sulfite of soda may be replaced by a corresponding quantity of bisulfite.

Having thus described my invention, what I claim as new is—

The described process of obtaining soluble coloring matters capable of use directly in dyeing or printing which process consists in treating the brown coloring matter known as "Cachou de Laval" with an alkaline sulfite or bisulfite, substantially as set forth.

In testimony whereof I have signed this specification in the presence of two subscribing witnesses.

RAYMOND VIDAL.

Witnesses:
CLYDE SHROPSHIRE,
JOSEPH LACOSTE.